United States Patent
Wan et al.

(10) Patent No.: US 10,671,994 B2
(45) Date of Patent: Jun. 2, 2020

(54) MOBILE TERMINAL HAVING OFFLINE TRANSACTION NOTIFICATION FUNCTION AND NOTIFICATION METHOD

(71) Applicant: CHINA UNIONPAY CO., LTD., Shanghai (CN)

(72) Inventors: Sishuang Wan, Shanghai (CN); Zhijun Lu, Shanghai (CN); Shuo He, Shanghai (CN); Yawei Yin, Shanghai (CN); Guobao Liu, Shanghai (CN)

(73) Assignee: CHINA UNIONPAY CO., LTD., Shanghai (CN)

( * ) Notice: Subject to any disclaimer, the term of this patent is extended or adjusted under 35 U.S.C. 154(b) by 242 days.

(21) Appl. No.: 15/559,935

(22) PCT Filed: Mar. 17, 2016

(86) PCT No.: PCT/CN2016/076571
§ 371 (c)(1),
(2) Date: Sep. 20, 2017

(87) PCT Pub. No.: WO2016/150329
PCT Pub. Date: Sep. 29, 2016

(65) Prior Publication Data
US 2018/0096342 A1  Apr. 5, 2018

(30) Foreign Application Priority Data
Mar. 24, 2015 (CN) .......................... 2015 1 0128743

(51) Int. Cl.
*G06Q 20/32* (2012.01)
*G06Q 20/38* (2012.01)
(Continued)

(52) U.S. Cl.
CPC ..... *G06Q 20/3278* (2013.01); *G06Q 20/0658* (2013.01); *G06Q 20/204* (2013.01);
(Continued)

(58) Field of Classification Search
None
See application file for complete search history.

(56) References Cited

U.S. PATENT DOCUMENTS 8,500,008 B2  8/2013  Masaryk et al.
8,756,168 B1  6/2014  Jayaram
(Continued)

FOREIGN PATENT DOCUMENTS

CM  101647034 A  2/2010
CN  102855562 A  1/2013
(Continued)

*Primary Examiner* — Allen C Chein
(74) *Attorney, Agent, or Firm* — The Ollila Law Group LLC

(57) ABSTRACT

The invention relates to a mobile terminal having an offline trade notification function and a notification method that is implemented using the mobile terminal. The mobile terminal having an offline trade notification function comprises: a storage module for storing an offline trade application described below; a wireless communication module having a field inductor that is used for detecting surrounding radio frequency signals and for generating a control signal; a processing module which generates an interruption event when it receives the control signal; an application module which can read trade data of the offline trade application according to the notification from the processing module, calculate trade data variation of the offline trade application, and inform an input/output module described below of the trade data variation; and the input/output module for informing the user of the event of data variation.

9 Claims, 4 Drawing Sheets

(51) Int. Cl.
  *G07G 1/12* (2006.01)
  *G06Q 20/06* (2012.01)
  *G06Q 20/20* (2012.01)
  *H04M 1/725* (2006.01)

(52) U.S. Cl.
  CPC .............. *G06Q 20/38* (2013.01); *G07G 1/12* (2013.01); *H04M 1/7253* (2013.01); *H04M 1/72597* (2013.01)

(56) References Cited

U.S. PATENT DOCUMENTS

| | | |
|---|---|---|
| 9,373,206 B2 | 6/2016 | Du |
| 9,747,597 B2 | 8/2017 | Wu |
| 10,096,016 B2 | 10/2018 | Picquenot |
| 2006/0287004 A1* | 12/2006 | Fuqua ................ G06Q 20/0658 455/558 |
| 2010/0136913 A1 | 6/2010 | Picquenot et al. |

FOREIGN PATENT DOCUMENTS

| | | |
|---|---|---|
| CN | 103164910 A | 6/2013 |
| CN | 103577983 A | 2/2014 |
| CN | 103839339 A | 6/2014 |
| CN | 103903367 A | 7/2014 |

\* cited by examiner

MOBILE TERMINAL HAVING OFFLINE TRANSACTION NOTIFICATION FUNCTION AND NOTIFICATION METHOD

FIELD OF THE INVENTION

The invention relates to mobile communication technology. More specifically, the invention relates to a mobile terminal having an offline trade notification function and a notification method that can conduct offline trade notification using the mobile terminal.

BACKGROUND

Non-contact smart cards are widely used in public transportation system and bank system. Currently, common non-contact smart cards comprise public transportation card, bank card or the like. These types of cards can support functions such as electronic cash deposition and offline trade, etc., and are already widely used in an enormous amount. When the card holder is consuming or taking a public transportation vehicle, in addition to an operation of increasing or decreasing the storage amount, a smart card trade terminal also records detailed information of this trade, e.g., date of trade, amount of trade and terminal code of trade.

However, such detailed information is only recorded in the smart card, and the user is not able to know on the spot the amount that was increased or decreased by. For situations such as erroneous card swiping or repeated card swiping, the user can not get to know immediately.

Moreover, in connection with the background of the invention, nowadays there are also many mobile terminals that are already integrated with NFC, i.e., near field communication. Such mobile terminals can take advantage of the NFC technology to read information in the smart card, including electronic cash balance, trade records, etc.

SUMMARY OF THE INVENTION

In view of the above problems, the invention aims to provide a mobile terminal having an offline trade notification function that can notify details of the offline trade to the user timely, as well as a notification method that is implemented using the mobile terminal.

The mobile terminal having an offline trade notification function of the invention is characterized by comprising:
- a storage module for storing an offline trade application described below;
- a wireless communication module having a field inductor that is used for detecting surrounding radio frequency signals and for generating a control signal;
- a processing module which generates an interruption event when it receives the control signal, and informs the offline trade application described below;
- an application module which can read trade data of the offline trade application according to the notification from the processing module, calculate trade data variation of the offline trade application, and inform an input/output module described below of the trade data variation; and
- the input/output module for informing the user of the event of data variation.

In one embodiment, the storage module at least has a security element, wherein the security element is used for storing the offline trade application.

In one embodiment, the wireless communication module further comprises a NFC controller for controlling NFC operation and data transmission.

In one embodiment, the field inductor generates the control signal when it senses that radio frequency signals are approaching/leaving.

In one embodiment, the input/output module at least comprises a display screen.

The offline trade notification method that is implemented using a mobile terminal according to the invention is characterized by comprising the following steps:
- a first radio frequency signal sensing step: when the mobile terminal is approaching an acceptance terminal, the mobile terminal senses radio frequency signals emitted from the acceptance terminal and generates an interruption event;
- a first data reading step: according to the notification of the interruption event, the balance of the offline trade application is read for the first time;
- a second radio frequency signal sensing step: when the mobile terminal is leaving the acceptance terminal, the mobile terminal senses leaving of the radio frequency signals of the acceptance terminal and generates an interruption event;
- a second data reading step: according to the notification of the interruption event, the balance of the offline trade application is read for the second time;
- a difference calculation step: a difference between the balances read for the two times is calculated; and
- a trade result informing step: the calculated difference is informed to the user.

In one embodiment, the first radio frequency signal sensing step comprises the following sub-steps:
- the mobile terminal approaching the acceptance terminal that can emit radio frequency signals;
- the field inductor in the mobile terminal detecting that the radio frequency signals are sensed;
- the field inductor inputting a corresponding control signal into the processing module of the mobile terminal in case that the radio frequency signals are sensed; and
- the processing module of the mobile terminal generating an interruption event.

In one embodiment, the second radio frequency signal sensing step comprises the following sub-steps:
- the mobile terminal leaving the acceptance terminal that can emit radio frequency signals, wherein the inductor in the mobile terminal can sense the leaving of the radio frequency signals;
- the field inductor inputting a corresponding control signal into the processing module of the mobile terminal in case that the leaving of the radio frequency signals is sensed; and
- the processing module generating an interruption event.

In one embodiment, the difference calculation step comprises the following sub-steps:
- calculating a difference of the balances of the application read for the two times as a trade amount; and
- determining the type of trade according to the positive or negative difference between the two balances.

In one embodiment, in the trade result informing step, the offline trade application informs the type of trade and the amount of trade to the user via a display screen.

According to the mobile terminal having an offline trade notification function and the notification method that is implemented using the mobile terminal, by adding a field inductor in the NFC module of the mobile device, when the mobile device is approaching the acceptance terminal, the field inductor receives an entry signal and notifies the processing module of the mobile terminal. The application module of the mobile terminal reads the current balance of the default card for payment for the first time. When the mobile device is leaving the acceptance terminal, the field inductor receives an exit signal and notifies the processing module of the mobile terminal. The application module of the mobile terminal reads the current balance of default card for the second time. By calculating a positive or negative difference between the two balances, it is determined whether the trade is a deposition trade or a consumption trade. Finally, the type of trade and the amount of trade are sent to the user together with the default card information in a trade notification. Therefore, the user can be informed of the details of the trade timely, and repeated trades can be avoided, thus reducing loss for the user and improving user's experience.

DETAILED DESCRIPTION OF THE INVENTION

Some of the many embodiments of the invention will be described below. These embodiments are intended to provide a basic understanding of the invention, and are not intended to identify crucial or decisive elements of the invention or define the scope of protection.

Figure 1:
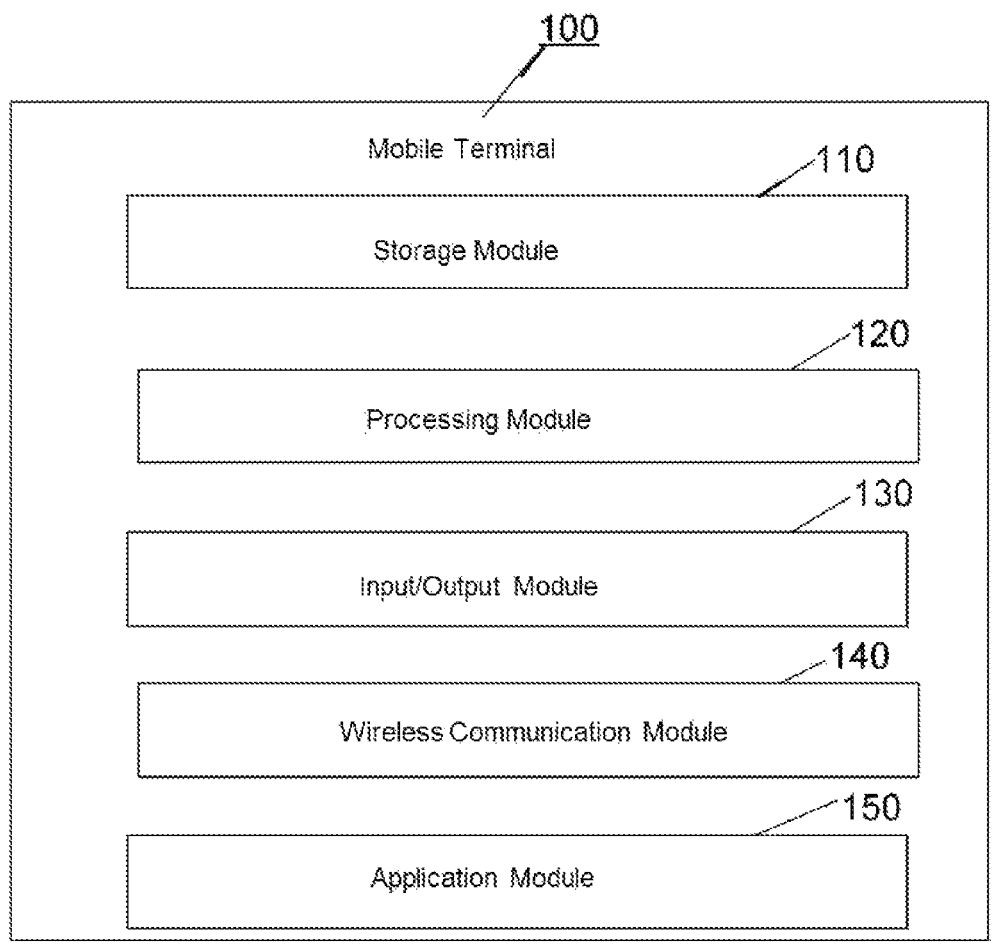
FIG. 1 is a block diagram showing the mobile terminal having an offline trade notification function of the invention.

FIG. 1 is a block diagram showing the mobile terminal having an offline trade notification function of the invention. As shown in FIG. 1, the mobile terminal 100 of the invention comprises a storage module 110, a processing module 120, an input/output module 130, a wireless communication module 140 and an application module 150.

The storage module 110 at least comprises a security element (SE) which stores an offline trade application that can be used for realizing offline trade, e.g., electronic cash application of bank card trade, transportation card application, etc. In addition, the storage module 110 may also comprise a magnetic disc storage unit, a flash storage unit or the like, which will not be defined herein.

The processing module 120 for example comprises a micro processing module, a micro controller, a digital signal processing module, an application specific integrated circuit, etc. In order that the device can communicate with external devices, the processing module is required to support a plurality of wireless communication protocols.

The input/output module 130 is an interface for data interaction with the outside, and comprises a user interface device (i.e., I/O device), a data port device and other types of input/output devices, which specifically comprises a touch screen, a display screen, a press key, a sensor, a microphone, etc.

The wireless communication module 140 may mainly comprise a base band, GPS, a local wireless transmission module, a remote wireless transmission module, a NFC processing module, a NFC coil, etc., wherein it is the NFC processing module that is related to the invention, which specifically comprises a field inductor and a NFC controller. The field inductor is used for detecting surrounding radio frequency signals, generating a control signal when approaching/leaving of the radio frequency signals is detected, outputting the control signal to the above processing module 120. The NFC controller is used for controlling the operation of NFC and data transmission.

The application module 150 can read trade data of the offline trade application according to the notification from the processing module 120, calculate data variation of the offline trade, and inform the input/output module 130 of the data variation, such as the balance.

The mobile terminal of the invention can be cell phone, watch, tablet computer, mobile wearing device, etc.

Figure 2:
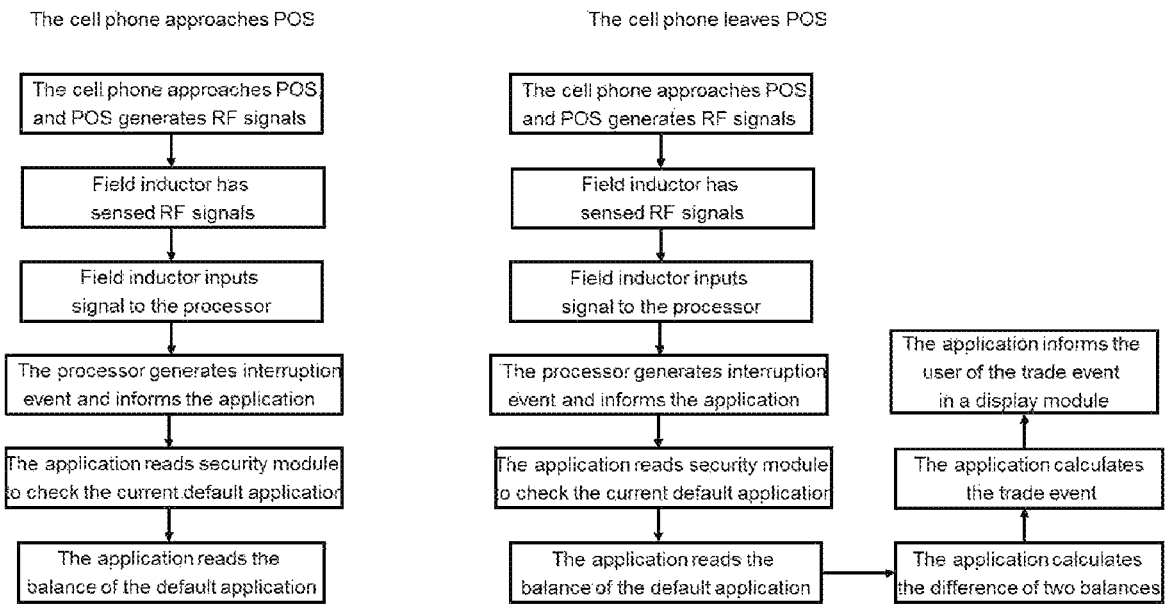
FIG. 2 shows the offline trade notification method implemented using the mobile terminal having an offline trade notification function of the invention.

FIG. 2 shows the offline trade notification method implemented using the mobile terminal having an offline trade notification function of the invention.

As shown in FIG. 2, the left side represents a process in which the mobile terminal approaches the POS terminal, and the right side represents a process in which the mobile terminal leaves the POS terminal.

Firstly, the process in which the mobile terminal approaches the POS terminal will be described.

As shown in FIG. 2, the acceptance terminal such as the POS terminal (or can also be another acceptance terminal of ATM device or the like, and the POS terminal is used herein as an example for illustration) will generate radio frequency signals, and the cell phone approaches the POS terminal;

the field inductor in the NFC processing module of the cell phone can detect surrounding radio frequency signals; when the cell phone approaches the POS terminal, the field inductor can sense the radio frequency signals;

the field inductor inputs a corresponding signal into the processing module 120 of the cell phone in case that the radio frequency signals are sensed;

the processing module 120 generates an interruption event and informs the corresponding application module (referred to as "application" for short in FIG. 2);

the application module checks the current default offline trade application from the security module; and the application module reads the balance of the default offline trade application for the first time.

Secondly, the process in which the mobile terminal leaves the POS terminal will be described.

The POS terminal will generate radio frequency signals, and the cell phone leaves the POS terminal.

the field inductor in the NFC processing module of the cell phone can detect surrounding radio frequency signals; when the cell phone leaves the POS terminal, the field inductor can sense the leaving of the radio frequency signals the field inductor inputs a corresponding signal into the processing module 120 of the cell phone in case that the leaving of the radio frequency signals is sensed the processing module 120 generates an interruption event and informs the corresponding application module;

the application module checks the current default offline trade application from the security module;

the application module reads the balance of the default offline trade application for the second time;

the application module calculates a difference between the two balances;

the application module determines a deposition trade or a consumption trade according to the positive or negative difference between the two balances; and the input/output module 130 (e.g., display screen) informs the user of the details of trade.

Figure 3:
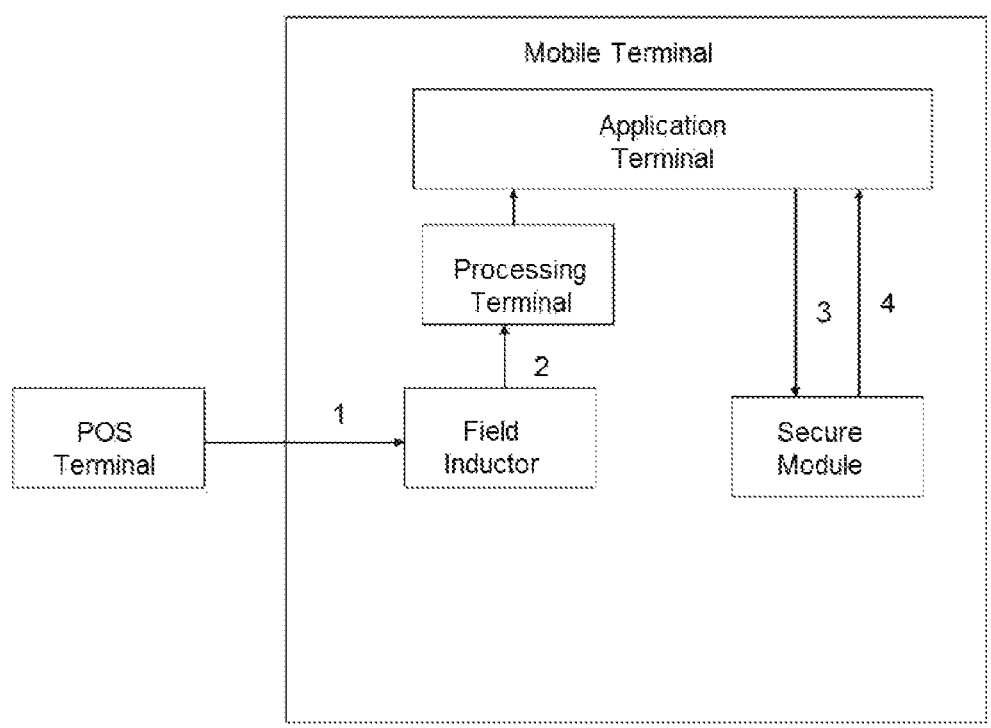
FIG. 3 shows the data flow when the mobile terminal (i.e., a cell-phone) is approaching a POS terminal.
Figure 4:
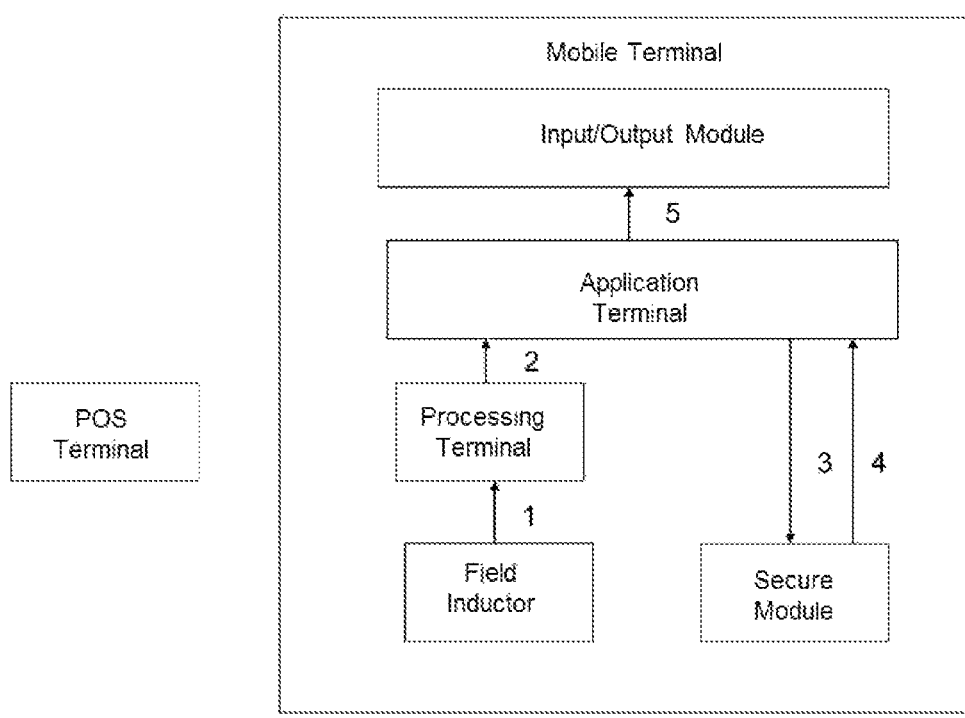
FIG. 4 shows the data flow when the mobile terminal (i.e., the cell-phone) is leaving the POS terminal.

FIG. 3 shows the data flow when the mobile terminal is approaching a POS terminal; and FIG. 4 shows the data flow when the mobile terminal is leaving the POS terminal.

As shown in FIG. 3:
1: when the NFC processing module is in an idle state, the field inductor in the NFC processing module can detect surrounding radio frequency signals;
2: when the user puts the mobile device close to POS terminal, the field inductor finds the radio frequency signals from the POS terminal;
3: the processing module generates an interruption event and informs the application module in the mobile device;
4: the application module initiates an instruction to check the current default offline trade application (e.g., e-wallet application or public transportation application or the like), and initiates an instruction to check the balance.

As shown in FIG. 4:
1: when the mobile device is leaving the POS terminal, the field inductor detects the leaving of radio frequency signals, and the field inductor outputs a corresponding control signal to the processing module;
2: the processing module generates an interruption event and informs the application module that receives the event;
3: the application module initiates an instruction to check the current default offline trade application, and initiates an instruction to check the balance of the current default offline trade application from the security module;
4: the application module makes a comparison between the two balances; if the balance is reduced, the trade is consumption; and if the balance is increased, the trade is deposition;
5: the offline trade application notifies the trade result to the input/output module, and the input/output module notifies the trade result to the user.

Two specific embodiments of the invention will be described below. In these two specific embodiments, the mobile device is a cell phone which comprises a security element (SE), in which the offline trade application for offline payment such as bank card electronic cash application and public transportation card application are stored, wherein the current default offline trade application is bank card electronic cash application.

First Embodiment

The first embodiment is an embodiment in which the user uses a cell phone to conduct consumption via the electronic cash application, wherein the acceptance terminal is the merchant's POS terminal which accepts the bank card trade. Hereinafter, a process in which the user uses a cell phone to make the payment via the electronic cash application will be described.
(1) when the cell phone is approaching the merchant's POS terminal, the field inductor receives the radio frequency signals emitted from the POS terminal;
(2) the radio frequency signal are transmitted to the processing module of the cell phone, the processing module notifies the cell phone to check the security element, and finds that the current default application is the bank card electronic cash application;
(3) the cell phone initiates an instruction to check the balance for the bank card electronic cash application;
(4) the cell phone records that the balance of the current electronic cash is 250 RMB;
(5) the cell phone leaves the merchant's POS terminal after completing the payment, and the field inductor finds that the radio frequency signals are disconnected;
(6) the field inductor sends the disconnection event to the processing module;
(7) the cell phone checks the security element according to the notification from the processing module, and finds that the current default application is the bank card electronic cash application;
(8) the cell phone initiates an instruction to check the balance for the bank card electronic cash application;
(9) the cell phone records that the balance of the current electronic cash is 150 RMB;
(10) the cell phone notifies the user that 100 RMB was consumed.

In this way, when the electronic cash application in the cell phone is used for deposition, the cell phone can provide the details of the trade to the user instantly so that the user can timely know the details of the deposition trade so as to avoid repeated trades or get to know a situation in which the amount of trade is inconsistent with the amount of trade that is actually required to be made.

Second Embodiment

The second embodiment is an embodiment in which the user conducts deposition on the electronic cash application in the cell phone on an ATM, wherein the acceptance terminal is the ATM of the acceptance bank. Hereinafter, a process in which the user uses a cell phone to conduct deposition via the electronic cash application will be described.
(1) when the cell phone is approaching the ATM, the field inductor receives the radio frequency signals emitted from the ATM;
(2) the radio frequency signal are transmitted to the processing module of the cell phone, the processing module notifies the cell phone to check the security module, and finds that the current default application is the bank card electronic cash application;
(3) the cell phone initiates an instruction to check the balance for the bank card electronic cash application;
(4) the cell phone records that the balance of the current electronic cash is 150 RMB;
(5) the cell phone leaves the ATM after completing the payment, and the field inductor finds that the radio frequency signals are disconnected;
(6) the field inductor sends the disconnection event to the processing module the processing module notifies the cell phone to check the security module, and finds that the current default application is the bank card electronic cash application;
(7) the cell phone application initiates an instruction to check the balance for the bank card electronic cash application;
(8) the cell phone application records that the balance of the current electronic cash is 200 RMB;
(9) the cell phone notifies the user that 50 RMB was deposited.

In this way, when the electronic cash application in the cell phone is used for deposition, the cell phone can provide the details of the trade to the user instantly so that the user can timely know the details of the deposition trade.

According to the mobile terminal having an offline trade notification function and the notification method that is implemented using the mobile terminal, by adding a field inductor in the NFC module of the mobile device, when the mobile device is approaching the acceptance terminal, the field inductor receives an entry signal and notifies the processing module of the mobile terminal. The current balance of the default card for payment is read for the first time. When the mobile device is leaving the acceptance terminal, the field inductor receives an exit signal and notifies the processing module of the mobile terminal. The current balance of the default card is read for the second time. By calculating a positive or negative difference between the two balances, it is determined whether the trade is a deposition trade or a consumption trade. Finally, the type of trade and the amount of trade are sent to the user together with the default card information in a trade notification. Therefore, the user can be informed of the details of the trade timely, and repeated trades can be avoided, thus reducing loss for the user and improving user's experience.

The above examples mainly illustrate the mobile terminal having an offline trade notification function and the notification method that can realize offline trade notification of the invention. While only some embodiments of the invention have been described, those skilled in the art will understand that the invention can be carried out in many other different ways without departing from the spirit and scope thereof. Therefore, the illustrated examples and embodiments should be considered as illustrative rather than limiting. The invention can cover various modifications and replacements without departing from the spirit and scope of the invention as defined by individual appended claims.

The invention claimed is:

1. A mobile terminal having an offline trade notification function, characterized by comprising:
   a storage module for storing an offline trade application;
   a wireless communication module having a field inductor that is used for sensing an approaching of radio frequency signals emitted from an acceptance terminal and generating a first control signal correspondingly, and for sensing a leaving of the radio frequency signals of the acceptance terminal and generating a second control signal correspondingly:
   a processing module which generates a first interruption event and a second interruption event when it receives the first control signal and the second control signal respectively, and informs an application module described below;
   the application module which reads a first balance and a second balance of the offline trade application according to a first notification corresponding to the first interruption event and a second notification corresponding to the second interruption event, respectively, from the processing module, calculate the difference between the first balance and the second balance, and inform an input/output module described below of the type of trade and an amount of trade corresponding to the difference: and
   the input/output module for informing the user of the type of trade and the amount of trade.

2. The mobile terminal having an offline trade notification function according to claim 1, wherein
   the storage module at least has a security element, wherein the security element is used for storing the offline trade application.

3. The mobile terminal having an offline trade notification function according to claim 2, wherein the wireless communication module further comprises a NFC controller for controlling NFC operation and data transmission.

4. The mobile terminal having an offline trade notification function according to claim 1, wherein the input/output module at least comprises a display screen.

5. An offline trade notification method that is implemented using a mobile terminal, characterized by comprising the following steps:
   a first radio frequency signal sensing step in which, when the mobile terminal is approaching an acceptance terminal, the mobile terminal senses approaching of radio frequency signals emitted from the acceptance terminal and generates a first interruption event correspondingly;
   a first data reading step in which according to the first notification corresponding to the first interruption event, the first balance of an offline trade application stored in the mobile terminal is read for the first time;
   a second radio frequency signal sensing step in which, when the mobile terminal is leaving the acceptance terminal, the mobile terminal senses leaving of the radio frequency signals of the acceptance terminal and generates a second interruption event correspondingly;
   a second data reading step in which, according to the second notification corresponding to the second interruption event, the second balance of the offline trade application is read for the second time;
   a difference calculation step in which, a difference between the first balance and the second balance is calculated; and
   a trade result informing step in which the calculated difference is informed to the user.

6. The offline trade notification method according to claim 5, wherein the first radio frequency signal sensing step comprises the following sub-steps:
   a field inductor in the mobile terminal sensing the approaching of the radio frequency signals when the mobile terminal approaches the acceptance terminal that can emit radio frequency signals;
   the field inductor inputting a corresponding control signal into a processing module of the mobile terminal in case that the radio frequency signals are sensed; and
   the processing module of the mobile terminal generating the interruption event.

7. The offline trade notification method according to claim 6, wherein the second radio frequency signal sensing step comprises the following sub-steps:
   a field inductor in the mobile terminal sensing the leaving of the radio frequency signals when the mobile terminal leaves the acceptance terminal that can emit radio frequency signals;
   the field inductor inputting a corresponding second control signal into a processing module of the mobile terminal in case that the leaving of the radio frequency signals is sensed; and
   the processing module generating the second interruption event.

8. The offline trade notification method according to claim 5, wherein the difference calculation step comprises the following sub-steps:
   calculating the difference between the first balance and the second balance as an amount of trade; and
   determining the type of trade according to the positive or negative difference between the first balance and the second balance.

9. The offline trade notification method according to claim 8, wherein
in the trade result informing step, the offline trade application informs the type of trade and the amount of trade to the user via a display screen.

\* \* \* \* \*